United States Patent
Schoeffel et al.

(10) Patent No.: US 10,927,241 B2
(45) Date of Patent: Feb. 23, 2021

(54) SULFUR-CROSSLINKABLE RUBBER MIXTURE, VULCANIZATE OF THE RUBBER MIXTURE, AND VEHICLE TIRE

(71) Applicant: Continental Reifen Deutschland GmbH, Hannover (DE)

(72) Inventors: Julia Schoeffel, Hannover (DE); Norbert Mueller, Nienhagen (DE); Carla Recker, Hannover (DE); Christine Weber, Garbsen (DE); Gesa Tarantola, Hannover (DE); David-Raphael Dauer, Hannover (DE); Fabian Schax, Seelze (DE); Nils Hojdis, Wuppertal (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 16/763,759

(22) PCT Filed: Sep. 4, 2018

(86) PCT No.: PCT/EP2018/073664
§ 371 (c)(1),
(2) Date: May 13, 2020

(87) PCT Pub. No.: WO2019/105614
PCT Pub. Date: Jun. 6, 2019

(65) Prior Publication Data
US 2020/0377699 A1 Dec. 3, 2020

(30) Foreign Application Priority Data
Nov. 28, 2017 (DE) ............. 10 2017 221 232.2

(51) Int. Cl.
*C08L 9/06* (2006.01)
*C08K 3/36* (2006.01)
*C08K 5/548* (2006.01)
*B60C 1/00* (2006.01)

(52) U.S. Cl.
CPC ............. *C08L 9/06* (2013.01); *B60C 1/0016* (2013.01); *C08K 3/36* (2013.01); *C08K 5/548* (2013.01); *C08L 2312/08* (2013.01)

(58) Field of Classification Search
CPC ............. C08L 9/06; C08K 3/36; C08K 5/548
USPC ...................................................... 523/156
See application file for complete search history.

(56) References Cited

U.S. PATENT DOCUMENTS

| 4,229,333 A | 10/1980 | Wolff et al. |
| 5,827,912 A | 10/1998 | Scholl |
| 2006/0094892 A1 | 5/2006 | Yanagisawa et al. |
| 2013/0030111 A1 | 1/2013 | Kojima |

FOREIGN PATENT DOCUMENTS

| DE | 2255577 A1 | 6/1974 | |
| DE | 2536674 A1 | 2/1977 | |
| DE | 102010037323 A1 | 3/2012 | |
| DE | 102013108937 A1 * | 2/2015 | ............... C08L 9/00 |
| EP | 0748839 A1 | 12/1996 | |
| EP | 1085045 A2 | 3/2001 | |
| JP | 2004322337 A | 11/2004 | |
| JP | 2012111838 A | 6/2012 | |
| WO | 2012092062 A1 | 7/2012 | |

OTHER PUBLICATIONS

International Search Report dated Nov. 28, 2018 of PCT application PCT/EP2018/071614 which this application is based on.
Database WPI, Week 201241 Thomson Scientific, London, GB; AN 2012-G69088 XP-002786619.
Database WPI, Week 200507 Thomson Scientific, London, GB; AN 2005-060509 XP-002786620.

* cited by examiner

*Primary Examiner* — Deve V Hall
(74) *Attorney, Agent, or Firm* — David L. Cate; Gregory Adams

(57) ABSTRACT

The invention relates to a sulfur-crosslinkable rubber mixture, to a vulcanizate thereof and to a vehicle tire. The sulfur-crosslinkable rubber mixture contains at least the following constituents:
at least one diene rubber; and
10 to 300 phr of at least one silica; and
1 to 30 phf of at least one silane A having general empirical formula A-I)

$$(R^1)_o\text{Si}-R^2-(S-R^3)_q-S-X; \text{ and} \qquad \text{A-I}$$

0.5 to 30 phf of at least one silane B having general empirical formula B-I)

$$(R^1)_o\text{Si}-R^2-(S-R^3)_u-S-R^2-\text{Si}(R^1)_o \qquad \text{B-I}$$

wherein q is 1, 2 or 3; and u is 1, 2 or 3; and X is a hydrogen atom or a $-C(=O)-R^8$ group wherein $R^8$ is selected from hydrogen $C_1$-$C_{20}$-alkyl groups, preferably $C_1$-$C_{17}$, $C_6$-$C_{20}$-aryl groups, preferably phenyl, $C_2$-$C_{20}$-alkenyl groups and $C_7$-$C_{20}$-aralkyl groups.

15 Claims, No Drawings

SULFUR-CROSSLINKABLE RUBBER MIXTURE, VULCANIZATE OF THE RUBBER MIXTURE, AND VEHICLE TIRE

The invention relates to a sulfur-crosslinkable rubber mixture, to a vulcanizate thereof and to a vehicle tire.

The rubber composition of the tread determines to a large extent the driving characteristics of a vehicle tire, in particular of a pneumatic vehicle tire.

Likewise the rubber mixtures that find use especially in the mechanically highly stressed parts in drive belts and other belts and hoses are substantially responsible for the stability and longevity of these rubber articles. Consequently these rubber mixtures for pneumatic vehicle tires, belts including drive belts and hoses are subject to very high requirements. There are conflicts between most of the known tire characteristics such as wet grip behaviour, dry braking, handling behaviour, rolling resistance, winter characteristics, abrasion behaviour and tear characteristics.

In pneumatic vehicle tires in particular there have been numerous attempts to positively influence the characteristics of the tire by varying the polymer components, the fillers and the other additives especially in the tread mixture.

It must be noted that an improvement in one tire characteristic often entails a deterioration in another characteristic.

In a given mixture system there are for example various known options for optimizing handling behaviour by increasing the stiffness of the rubber mixture. Mentionable here are for example increasing the filler level and increasing the crosslink node density of the vulcanized rubber mixture. While an increased filler content entails disadvantages in terms of rolling resistance, enhancing the network results in a deterioration in the tear characteristics and the wet grip indicators of the rubber mixture.

It is also known that rubber mixtures, in particular for the tread of pneumatic vehicle tires, may contain silica as a filler. It is additionally known that advantages in terms of rolling resistance behaviour and processability of the rubber mixture are achieved when the silica is bonded to the polymer(s) by means of silane coupling agents.

Silane coupling agents known from the prior art are disclosed in DE 2536674 C3 and DE 2255577 C3 for example.

It is in principle possible to distinguish between silanes which bond only to silica or comparable fillers and to this end comprise in particular at least one silyl group and silanes which in addition to a silyl group comprise a reactive sulfur moiety, such as in particular an $S_x$ moiety (where x> or equal to 2) or a mercapto group S—H or blocked S-PG moiety, wherein PG stands for protecting group, so that the silane by reaction of the $S_x$ or S—H moiety or of the S-PG moiety after removal of the protecting group during the sulfur vulcanization can also bond to polymers.

The prior art in some cases also discloses combinations of selected silanes. EP 1085045 B1 discloses a rubber mixture containing a combination of a polysulfidic silane (mixture having disulfide content of 69% to 79% by weight, trisulfide content of 21% to 31% by weight and tetrasaulfide content of 0% to 8% by weight) and a silane which comprises only one sulfur atom and thus cannot bond to polymers. Such a silane mixture makes it possible to achieve in combination with carbon black and silica as a filler an optimized profile of properties in terms of the laboratory predictors for inter alia rolling resistance and abrasion and optimal tire characteristics when used in treads of vehicle tires.

WO 2012092062 discloses a combination of a blocked mercaptosilane (NXT) with filler-reinforcing silanes comprising nonreactive alkyl groups between the silyl groups.

The problem addressed by the present invention is accordingly that of providing a rubber mixture which compared to the prior art exhibits an improvement in the profile of characteristics, in particular in stiffness, hardness and rolling resistance indicators. As a result of this the rubber mixture, in particular for use in vehicle tires, shall exhibit an improved handling behaviour coupled with reduced heat build-up. At the same time the remaining characteristics, in particular for use in vehicle tires, shall remain at a comparable and acceptable level.

This problem is solved by a rubber mixture containing the following constituents:
at least one diene rubber; and
10 to 300 phr of at least one silica; and
1 to 30 phf of at least one silane A having general empirical formula A-I)

$$(R^1)_o Si—R^2—(S—R^3)_q—S—X;\text{ and} \qquad \text{A-I)}$$

0.5 to 30 phf of at least one silane B having general empirical formula B-I)

$$(R^1)_o Si—R^2—(S—R^3)_u—S—R^2—Si(R^1)_o \qquad \text{B-I)}$$

wherein o may be 1 or 2 or 3 and the radicals $R^1$ may be identical or different and are selected from $C_1$-$C_{10}$-alkoxy groups,
$C_6$-$C_{20}$-phenoxy groups, $C_2$-$C_{10}$-cyclic dialkoxy groups, $C_2$-$C_{10}$-dialkoxy groups, $C_4$-$C_{10}$-cycloalkoxy groups, $C_6$-$C_{20}$-aryl groups,
$C_1$-$C_{10}$-alkyl groups, $C_2$-$C_{20}$-alkenyl groups, $C_2$-$C_{20}$-alkynyl groups,
$C_7$-$C_{20}$-aralkyl groups, halides or
alkyl polyether group —O—$(R^6$—O$)_r$—$R^7$, wherein the radicals $R^6$ are identical or different and are branched or unbranched, saturated or unsaturated, aliphatic, aromatic or mixed aliphatic/aromatic divalent $C_1$-$C_{30}$-hydrocarbon group, r is an integer from 1 to 30, and the radicals $R^7$ are unsubstituted or substituted, branched or unbranched monovalent alkyl, alkenyl, aryl or aralkyl groups, or
two $R^1$ correspond to a dialkoxy group having 2 to 10 carbon atoms wherein in that case o<3,
or two or more silanes of formulae A-I) and/or B-I) may be bridged via radicals $R^1$ or by condensation; and
with the proviso that in the formulae A-I) and B-I) in each $(R^1)_o$Si group at least one $R^1$ is selected from the abovementioned options where this $R^1$ i) is bonded to the silicon atom via an oxygen atom or ii) is a halide; and
wherein the radicals $R^2$ and $R^3$ in each molecule and within a molecule may be identical or different and are branched or unbranched, saturated or unsaturated, aliphatic, aromatic or mixed aliphatic/aromatic divalent $C_1$-$C_3 M$-hydrocarbon groups; and wherein
q is 1 or 2 or 3; and u is 1 or 2 or 3; and X is a hydrogen atom or a —C(=O)—$R^8$ group wherein $R^8$ is selected from hydrogen, $C_1$-$C_{20}$-alkyl groups, preferably $C_1$-$C_{17}$, $C_6$-$C_{20}$-aryl groups, preferably phenyl, $C_2$-$C_{20}$-alkenyl groups and $C_7$-$C_{20}$-aralkyl groups.

It has now been found that, surprisingly, the combination of the silanes A and B, wherein silane A can also bond to polymers on account of the reactive S-X group, achieves an improvement in the rubber mixture according to the invention with respect to the indicators for handling and heat build-up or rolling resistance.

The present invention further provides a vulcanizate of at least one rubber mixture according to the invention.

The present invention further provides a vehicle tire which comprises at least one vulcanizate according to the invention of the rubber mixture according to the invention in at least one component part. It is preferable when the vehicle tire comprises the at least one vulcanizate at least in the tread.

The vulcanizate according to the invention and the vehicle tire according to the invention feature optimized handling predictors and improved rolling resistance.

In the case of two-part treads (upper part: cap and lower part: base) the rubber mixture according to the invention may be used both for the cap and for the base. It is preferable when at least the cap or at least the base or at least the cap and the base comprise(s) at least one vulcanizate according to the invention of the rubber mixture according to the invention.

In the context of the present invention vehicle tires are to be understood as meaning pneumatic vehicle tires and solid rubber tires, including tires for industrial and construction site vehicles, HGV tires, passenger car tires and bicycle and motorcycle tires.

The rubber mixture according to the invention is moreover also suitable for other components of vehicle tires, for example in particular the flange profile, and also for internal tire components. The rubber mixture according to the invention is moreover also suitable for other technical rubber articles, such as bellows, conveyor belts, air springs, belts including drive belts or hoses as well as shoe soles.

The constituents of the sulfur-crosslinkable rubber mixture according to the invention are more particularly described hereinbelow. All elucidations also apply to the vulcanizate according to the invention and the vehicle tire according to the invention which comprises at least one vulcanizate according to the invention of the rubber mixture according to the invention in at least one component part.

The unit phr (parts per hundred parts of rubber by weight) used in this document is the customary quantity unit for mixture recipes in the rubber industry. The dosage of the parts by weight of the individual substances is in this document based on 100 parts by weight of the total mass of all rubbers present in the mixture having a molecular weight $M_w$ by GPC of greater than 20 000 g/mol.

The unit phf (parts per hundred parts of filler by weight) used in this document is the customary quantity unit for coupling agents for fillers in the rubber industry.

In the context of the present application phf relates to the silica present, i.e. any other fillers such as carbon black that may be present are not included in the calculation of the silane quantity.

According to the invention the rubber mixture is sulfur-crosslinkable and to this end contains at least one diene rubber.

Diene rubbers are to be understood as meaning rubbers that are formed by polymerization or copolymerization of dienes and/or cycloalkanes and thus comprise C=C-double bonds either in the main chain or in the side groups. The diene rubber is preferably selected from the group consisting of natural polyisoprene and/or synthetic polyisoprene and/or epoxidized polyisoprene and/or butadiene rubber and/or butadiene-isoprene rubber and/or solution-polymerized stirene-butadiene rubber and/or emulsion-polymerized stirene-butadiene rubber and/or stirene-isoprene rubber and/or liquid rubbers having a molecular weight $M_W$ of greater than 20 000 g/mol and/or halobutyl rubber and/or polynorbonene and/or isoprene-isobutylene copolymer and/or ethylene-propylene-diene rubber and/or nitrile rubber and/or chloroprene rubber and/or acrylate rubber and/or fluoro rubber and/or silicone rubber and/or polysulfide rubber and/or epichlorohydrin rubber and/or stirene-isoprene-butadiene terpolymer and/or hydrogenated acrylonitrile-butadiene rubber and/or hydrogenated stirene-butadiene rubber.

Nitrile rubber, hydrogenated acrylonitrile-butadiene rubber, chloroprene rubber, butyl rubber, halobutyl rubber or ethylene-propylene-diene rubber in particular are employed in the production of technical rubber articles, such as belts including drive belts and hoses and/or shoe soles. It is preferable to use the mixture recipes that are known to those skilled in the art—and are particular in terms of fillers, plasticizers, vulcanization systems and additives—for these rubbers.

The rubber mixture is suitable for vehicle tires in particular and may in principle be used in any component part, such as in particular the tread, the sidewall, the flange profile and also in other so-called body components.

It is preferable when the diene rubber is selected from the group consisting of natural polyisoprene (NR), synthetic polyisoprene (IR), butadiene rubber (BR), solution-polymerized stirene-butadiene rubber (SSBR), emulsion-polymerized stirene-butadiene rubber (ESBR), butyl rubber (IIR) and halobutyl rubber.

In a particularly preferred embodiment of the invention the diene rubber is selected from the group consisting of natural polyisoprene (NR), synthetic polyisoprene (IR), butadiene rubber (BR), solution-polymerized stirene-butadiene rubber (SSBR) and emulsion-polymerized stirene-butadiene rubber (ESBR). Such a rubber mixture is suitable for the tread of vehicle tires in particular.

In a particularly advantageous embodiment of the invention the rubber mixture contains at least one natural polyisoprene preferably in amounts of 2 to 100 phr and in a particularly advantageous embodiment of the invention 5 to 30 phr, very particularly preferably 5 to 15 phr. This achieves a particularly good processability of the rubber mixture according to the invention.

In a particularly advantageous embodiment of the invention the rubber mixture contains at least one polybutadiene (butadiene rubber) preferably in amounts of 2 to 100 phr and according to a particularly advantageous embodiment of the invention 5 to 50 phr, very particularly preferably 10 to 25 phr. This achieves particularly good abrasion and tear characteristics and a good processability coupled with a low hysteresis loss of the rubber mixture according to the invention.

In a particularly advantageous embodiment of the invention the rubber mixture contains at least one stirene-butadiene rubber (SBR) preferably in amounts of 2 to 100 phr and in a particularly advantageous embodiment of the invention 25 to 80 phr, very particularly preferably 65 to 85 phr. This achieves a good processability coupled with a low hysteresis loss and also good abrasion and tear characteristics of the rubber mixture according to the invention.

The SBR is here preferably an SSBR which results in optimized hysteresis characteristics.

In a particularly advantageous embodiment of the invention the rubber mixture contains a polymer blend of the recited rubbers NR, BR and SBR, preferably SSBR, preferably in the amounts recited in each case in any conceivable combination, wherein the sum of all rubbers present is 100 phr.

2

In a particularly advantageous embodiment the rubber mixture contains 5 to 30 phr of at least one natural and/or at least one synthetic polyisoprene and 25 to 80 phr of at least one stirene-butadiene rubber and 5 to 50 phr of at least one butadiene rubber.

The natural and/or synthetic polyisoprene in all embodiments may be either cis-1,4-polyisoprene or 3,4-polyisoprene. However, preference is given to using cis-1,4-polyisoprenes having a cis-1,4 content >90% by weight. Firstly, such a polyisoprene may be obtained by stereospecific polymerization in solution with Ziegler-Natta catalysts or using finely divided alkyllithiums. Secondly, natural rubber (NR) is a cis-1,4-polyisprene of this type in which the cis-1,4 content in the natural rubber is greater than 99% by weight.

Also conceivable is a mixture of one or more natural polyisoprenes with one or more synthetic polyisoprenes.

If the rubber mixture according to the invention contains butadiene rubber (BR, polybutadiene) this may be any of the types known to those skilled in the art. These include inter alia so-called high-cis and low-cis types, wherein polybutadiene having a cis content of not less than 90% by weight is referred to as high-cis type and polybutadiene having a cis content of less than 90% by weight is referred to as low-cis type. An example of a low-cis polybutadiene is Li-BR (lithium-catalysed butadiene rubber) having a cis content of 20% to 50% by weight. A high-cis BR achieves particularly good abrasion characteristics and a low hysteresis of the rubber mixture.

The one or more polybutadienes employed may be end group-modified with modifications and functionalizations and/or functionalized along the polymer chains. The modification may be modifications with hydroxyl groups and/or ethoxy groups and/or epoxy groups and/or siloxane groups and/or amino groups and/or aminosiloxane and/or carboxyl groups and/or phthalocyanine groups and/or silane-sulfide groups. However, further modifications, also known as functionalizations, known to those skilled in the art are also suitable. Such functionalizations may comprise metal atoms as a constituent.

In the case where at least one stirene-butadiene rubber (stirene-butadiene copolymer) is present in the rubber mixture this may be either solution-polymerized stirene-butadiene rubber (SSBR) or emulsion-polymerized stirene-butadiene rubber (ESBR), a mixture of at least one SSBR and at least one ESBR also being employable. The terms "stirene-butadiene rubber" and "stirene-butadiene copolymer" are used synonymously in the context of the present invention.

The employed stirene-butadiene copolymer may be end group-modified and/or functionalized along the polymer chains with the modifications and functionalizations recited above for the polybutadiene.

According to the invention the rubber mixture contains 10 to 300 phr of at least one silica. The silica may be selected from the silica types that are known to those skilled in the art and are suitable as a filler for tire rubber mixtures. However, particular preference is given to using a finely divided, precipitated silica having a nitrogen surface area (BET surface area) (according to DIN ISO 9277 and DIN 66132) of 35 to 400 m$^2$/g, preferably of 35 to 350 m$^2$/g, particularly preferably of 85 to 320 m$^2$/g and very particularly preferably of 120 to 235 m$^2$/g and a CTAB surface area (according to ASTM D 3765) of 30 to 400 m$^2$/g, preferably of 30 to 330 m$^2$/g, particularly preferably of 80 to 300 m$^2$/g and very particularly preferably of 110 to 230 m$^2$/g. Such silicas result for example in rubber mixtures for tire treads in particularly good physical characteristics of the vulcanizates. Also attainable are advantages in mixture processing as a result of a reduction in the mixing time while retaining the same product characteristics, thus leading to improved productivity. Employable silicas thus include for example those of the Ultrasil® VN3 type (trade name) from Evonik or highly dispersible silicas, so-called HD silicas (e.g. Zeosil® 1165 MP from Solvay).

In a preferred embodiment of the invention the rubber mixture according to the invention contains 20 to 300 phr, preferably 30 to 250 phr, particularly preferably 30 to 150 phr and very particularly preferably 80 to 110 phr of at least one silica. Particularly, a comparatively high silica content of up to 300 phr or 250 phr or 150 phr or 110 phr in combination with the two recited silanes A and B which are more particularly elucidated hereinbelow results in particular in advantageous characteristics in terms of the tire characteristics of the rubber mixture and the vulcanizates thereof, in particular optimized handling and rolling resistance predictors.

In cases where at least two different silicas differing for example in terms of their BET surface area are present in the rubber mixture according to the invention the recited quantities always relate to the total amount of all silicas present.

The rubber mixture according to the invention may further contain at least one carbon black, in particular an industrial black. Suitable carbon blacks include all carbon black types known to those skilled in the art. In one embodiment the carbon black has an iodine number according to ASTM D 1510, also known as the iodine adsorption number, between 30 and 250 g/kg, preferably 30 to 180 g/kg, particularly preferably 40 to 180 g/kg, and very particularly preferably 40 to 130 g/kg, and a DBP number according to ASTM D 2414 of 30 to 200 ml/100 g, preferably 70 to 200 ml/100 g, particularly preferably 90 to 200 ml/100 g.

The DBP number according to ASTM D 2414 determines the specific absorption volume of a carbon black or a light filler using dibutyl phthalate.

The use of such a carbon black type in the rubber mixture, in particular for vehicle tires, ensures a best-possible compromise between abrasion resistance and heat build-up which in turn affects the environmentally relevant rolling resistance. It is preferable when only one carbon black type is used in the particular rubber mixture but it is also possible to incorporate various carbon black types into the rubber mixture. The total amount of carbon blacks present is preferably 0 to 250 phr.

In an advantageous embodiment of the invention the rubber mixture contains 0 to 20 phr, preferably 0 to 10 phr, of at least one carbon black and 30 to 300 phr, preferably 30 to 200 phr, of at least one silica.

In a further advantageous embodiment of the invention the rubber mixture contains 30 to 150 phr of at least one carbon black and 10 to 30 phr of at least one silica and thus constitutes a part-silica mixture.

The rubber mixture according to the invention may contain preferably the smallest possible amounts, i.e. preferably 0 to 20 phr, particularly preferably 0 to 10 phr, of further fillers. In the context of the present invention the further (non-reinforcing) fillers include aluminosilicates, kaolin, chalk, starch, magnesium oxide, titanium dioxide or rubber gels and also fibres (for example aramid fibres, glass fibres, carbon fibres, cellulose fibres).

Further optionally reinforcing fillers include for example carbon nanotubes (CNT) including discrete CNTs, so-called hollow carbon fibres (HCF) and modified CNT containing one or more functional groups, such as hydroxyl, carboxy and carbonyl groups, graphite and graphenes and so-called "carbon-silica dual-phase fillers".

In the context of the present invention zinc oxide is not included among the fillers.

According to the invention the rubber mixture contains 1 to 30 phf, preferably 2 to 20 phf, particularly preferably 2 to 10 phf, of at least one silane A having the general empirical formula A-I)

$$(R^1)_o Si—R^2—(S—R^3)_q—S—X;\qquad \text{A-I)}$$

and 0.5 to 30 phf, preferably 0.5 to 20 phf, particularly preferably 1 to 10 phf, of at least one silane B having the general empirical formula B-I)

$$(R^1)_o Si—R^2—(S—R^3)_u—S—R^2—Si(R^1)_o,\qquad \text{B-I)}$$

wherein o may be 1, 2 or 3 and the radicals $R^1$ may be identical or different and are selected from $C_1$-$C_{10}$-alkoxy groups, $C_6$-$C_{20}$-phenoxy groups, $C_2$-$C_{10}$-cyclic dialkoxy groups, $C_2$-$C_{10}$-dialkoxy groups, $C_4$-$C_{10}$-cycloalkoxy groups, $C_6$-$C_{20}$-aryl groups, $C_1$-$C_{10}$-alkyl groups, $C_2$-$C_{20}$-alkenyl groups, $C_2$-$C_{20}$-alkynyl groups, $C_7$-$C_{20}$-aralkyl groups, halides or alkyl polyether group —O—$(R^6$—O$)_r$—$R^7$, wherein the radicals $R^6$ are identical or different and are branched or unbranched, saturated or unsaturated, aliphatic, aromatic or mixed aliphatic/aromatic divalent $C_1$-$C_{30}$-hydrocarbon group, r is an integer from 1 to 30, and the radicals $R^7$ are unsubstituted or substituted, branched or unbranched monovalent alkyl, alkenyl, aryl or aralkyl groups, or two $R^1$ correspond to a dialkoxy group having 2 to 10 carbon atoms, wherein then o<3 (o is less than three), or two or more silanes of formulae A-I) and/or B-I) may be bridged via radicals $R^1$ or by condensation; and with the proviso that in the formulae A-I) and B-I) in each $(R^1)_o Si$ group at least one $R^1$ is selected from the above-mentioned options where this $R^1$ i) is bonded to the silicon atom via an oxygen atom or ii) is a halide; and wherein the radicals $R^2$ and $R^3$ in each molecule and within a molecule may be identical or different and are branched or unbranched, saturated or unsaturated, aliphatic, aromatic or mixed aliphatic/aromatic divalent $C_1$-$C_{30}$-hydrocarbon groups; and wherein q is 1 or 2 or 3; and u is 1 or 2 or 3; and X is a hydrogen atom or a —C(=O)—$R^8$ group wherein R is selected from hydrogen, $C_1$-$C_{20}$-alkyl groups, preferably $C_1$-$C_{17}$, $C_6$-$C_{20}$-aryl groups, preferably phenyl, $C_2$-$C_{20}$-alkenyl groups and $C_7$-$C_{20}$-aralkyl groups.

The silane A present according to the invention is by virtue of the S-X-moiety a silane that by elimination of X, i.e. of the hydrogen atom or of the —C(=O)—R group, can bond to polymers.

It is also possible for different silanes having different groups X to be present in admixture.

X is a hydrogen atom or a —C(=O)—$R^8$ group, wherein $R^8$ is selected from hydrogen, $C_1$-$C_{20}$ alkyl groups, preferably $C_1$-$C_{17}$, $C_6$-$C_{20}$-aryl groups, preferably phenyl, $C_2$-$C_{20}$-alkenyl groups and $C_7$-$C_{20}$-aralkyl groups.

It is preferable when X is a —C(=O)—$R^8$ group, wherein $R^8$ is particularly preferably a $C_1$-$C_{20}$-alkyl group; X is thus an alkanoyl group in this case.

In an advantageous embodiment the alkanoyl group has altogether 1 to 3 carbon atoms, in particular 2 carbon atoms.

In a further advantageous embodiment the alkanoyl group has altogether 7 to 9 carbon atoms, in particular 8 carbon atoms.

In a further advantageous embodiment the alkanoyl group has altogether 17 to 19 carbon atoms, in particular 18 carbon atoms.

The index q may take the values 1 or 2 or 3. It is preferable when q is 1.

The silane B present in accordance with the invention has individual sulfur atoms which cannot bond to the polymer chains of the diene rubber since the chemical moiety C—S—C typically does not open during the vulcanization.

The index u may take the values 1 or 2 or 3. It is preferable when u is 1.

The following elucidations in respect of $R^1$, $R^2$ and $R^3$ apply to the silanes according to the formulae A-I) and B-I) unless otherwise stated.

$R^2$ or $R^3$ may in particular and preferably be —$CH_2$—, —$CH_2CH_2$—, —$CH_2CH_2CH_2$—, —$CH_2CH_2CH_2CH_2$—, —$CH(CH_3)$—, —$CH_2CH(CH_3)$—, —$CH(CH_3)CH_2$—, —$C(CH_3)_2$—, —$CH(C_2H_5)$—, —$CH_2CH_2CH(CH_3)$—, —$CH(CH_3)CH_2CH_2$—, —$CH_2CH(CH_3)CH_2$—, —$CH_2CH_2CH_2CH_2CH_2$—, —$CH_2CH_2CH_2CH_2CH_2CH_2$—, —$CH_2CH_2CH_2CH_2CH_2CH_2CH_2$—, —$CH_2CH_2CH_2CH_2CH_2CH_2CH_2CH_2$—, —$CH_2CH_2CH_2CH_2CH_2CH_2CH_2CH_2CH_2$—, —$CH_2CH_2CH_2CH_2CH_2CH_2CH_2CH_2CH_2CH_2$—, —$CH_2CH_2CH_2CH_2CH_2CH_2CH_2CH_2CH_2CH_2CH_2$—, —$CH_2CH_2CH_2CH_2CH_2CH_2CH_2CH_2CH_2CH_2CH_2CH_2$—, —$CH_2CH_2CH_2CH_2CH_2CH_2CH_2CH_2CH_2CH_2CH_2CH_2CH_2$—, —$CH_2CH_2CH_2CH_2CH_2CH_2CH_2CH_2CH_2CH_2CH_2CH_2CH_2CH_2$—, —$CH_2CH_2CH_2CH_2CH_2CH_2CH_2CH_2CH_2CH_2CH_2CH_2CH_2CH_2CH_2CH_2$—, —$CH_2CH_2CH_2CH_2CH_2CH_2CH_2CH_2CH_2CH_2CH_2CH_2CH_2CH_2CH_2CH_2CH_2CH_2$— or $R^2$ is preferably an alkyl group having 2 or 3 carbon atoms and preferably —$CH_2CH_2$— or —$CH_2CH_2CH_2$—, particularly preferably —$CH_2CH_2CH_2$—.

$R^3$ is preferably an alkyl group having 4 to 8 carbon atoms and preferably —$CH_2CH_2CH_2CH_2CH_2$—, —$CH_2CH_2CH_2CH_2CH_2CH_2$—, —$CH_2CH_2CH_2CH_2CH_2CH_2CH_2$—, —$CH_2CH_2CH_2CH_2CH_2CH_2CH_2CH_2$—, particularly preferably —$CH_2CH_2CH_2CH_2CH_2CH_2$—.

All recited radicals $R^1$ and bridgings of one or more silanes via radicals $R^1$ may be combined with one another within a silyl group.

In the case where two $R^1$ correspond to a dialkoxy group having 2 to 10 carbon atoms and then o<3 (o is less than three) the silicon atom is part of a ring system.

In the case where two silanes of formula A-I) and/or B-I) are bridged with one another they share a radical $R^1$ or by combination of two Si—$R^1$ groups are linked to one another via an oxygen atom. This also allows more than two silanes to be linked to one another.

Following the synthesis of the silane of formula A-I) and/or B-I) it is thus conceivable for two silanes of formula A-I) and/or B-I) to be bridged with one another via an oxygen atom or via the radicals $R^1$. This also allows more than two silanes to be linked to one another, for example via dialkoxy groups.

The rubber mixture according to the invention may thus also contain oligomers formed by hydrolysis and condensation or by bridging via dialkoxy groups as $R^1$ of the silanes A and/or silanes B (silanes of formula A-I) and/or B-I)).

As a result of the proviso that in the formulae A-I) and B-I) in each $(R^1)_o$Si group at least one $R^1$ is selected from the abovementioned options where this $R^1$ i) is bonded to the silicon atom via an oxygen atom or ii) is a halide, the silanes of formulae A-I) and B-I) each comprise at least one radical $R^1$ that may serve as a leaving group.

These are thus in particular alkoxy groups, phenoxy groups or any other of the recited groups bonded to the silicon atom via an oxygen atom, or halides.

It is preferable when the radicals $R^1$ comprise alkyl groups having 1 to 6 carbon atoms or alkoxy groups having 1 to 6 carbon atoms or halides, alkoxy groups having 1 to 6 carbon atoms being particularly preferred.

In a particularly advantageous embodiment of the invention the radicals $R^1$ within a silyl group $(R^1)_o$Si— are identical and alkoxy groups having 1 or 2 carbon atoms, i.e. methoxy groups or ethoxy groups, very particularly preferably ethoxy groups, wherein o is 3.

However, in the case of oligomers too or in the case where two $R^1$ form a dialkoxy group the remaining radicals $R^1$ are preferably alkyl groups having 1 to 6 carbon atoms or halides or alkoxy groups having 1 to 6 carbon atoms, preferably 1 or 2 carbon atoms, i.e. methoxy groups or ethoxy groups, very particularly preferably ethoxy groups.

In the context of the present invention ethoxy groups in the formulae of the silanes are abbreviated to EtO or OEt. The two notations elucidate that alkoxy groups, like ethoxy groups, are bonded to the silicon atom Si via the oxygen atom O.

However, the abbreviations OEt and EtO may in principle be used synonymously in the context of the present invention.

Silanes A of the formula A-I) may preferably be:
$(EtO)_3Si$—$(CH_2)_3$—S—$(CH_2)$—S—C(=O)—$CH_3$,
$(EtO)_3Si$—$(CH_2)_3$—S—$(CH_2)$—S—C(=O)—$C_2H_5$,
$(EtO)_3Si$—$(CH_2)_3$—S—$(CH_2)$—S—C(=O)—$C_3H_7$,
$(EtO)_3Si$—$(CH_2)_3$—S—$(CH_2)$—S—C(=O)—$C_4H_9$,
$(EtO)_3Si$—$(CH_2)_3$—S—$(CH_2)$—S—C(=O)—$C_5H_{11}$,
$(EtO)_3Si$—$(CH_2)_3$—S—$(CH_2)$—S—C(=O)—$C_6H_3$,
$(EtO)_3Si$—$(CH_2)_3$—S—$(CH_2)$—S—C(=O)—$C_7H_{15}$,
$(EtO)_3Si$—$(CH_2)_3$—S—$(CH_2)$—S—C(=O)—$C_9H_9$,
$(EtO)_3Si$—$(CH_2)_3$—S—$(CH_2)$—S—C(=O)—$C_{11}H_{23}$,
$(EtO)_3Si$—$(CH_2)_3$—S—$(CH_2)$—S—C(=O)—$C_{13}H_{27}$,
$(EtO)_3Si$—$(CH_2)_3$—S—$(CH_2)$—S—C(=O)—$C_{15}H_{31}$,
$(EtO)_3Si$—$(CH_2)_3$—S—$(CH_2)$—S—C(=O)—$C_{17}H_{35}$,
$(EtO)_3Si$—$(CH_2)_3$—S—$(CH_2)_2$—S—C(=O)—$CH_3$,
$(EtO)_3Si$—$(CH_2)_3$—S—$(CH_2)_2$—S—C(=O)—$C_2H_5$,
$(EtO)_3Si$—$(CH_2)_3$—S—$(CH_2)_2$—S—C(=O)—$C_3H_7$,
$(EtO)_3Si$—$(CH_2)_3$—S—$(CH_2)_2$—S—C(=O)—$C_4H_9$,
$(EtO)_3Si$—$(CH_2)_3$—S—$(CH_2)_2$—S—C(=O)—$C_5H_{11}$,
$(EtO)_3Si$—$(CH_2)_3$—S—$(CH_2)_2$—S—C(=O)—$C_6H_3$,
$(EtO)_3Si$—$(CH_2)_3$—S—$(CH_2)_2$—S—C(=O)—$C_7H_{15}$,
$(EtO)_3Si$—$(CH_2)_3$—S—$(CH_2)_2$—S—C(=O)—$C_9H_9$,
$(EtO)_3Si$—$(CH_2)_3$—S—$(CH_2)_2$—S—C(=O)—$C_{11}H_{23}$,
$(EtO)_3Si$—$(CH_2)_3$—S—$(CH_2)_2$—S—C(=O)—$C_3H_{27}$,
$(EtO)_3Si$—$(CH_2)_3$—S—$(CH_2)_2$—S—C(=O)—$C_{15}H_{31}$,
$(EtO)_3Si$—$(CH_2)_3$—S—$(CH_2)_2$—S—C(=O)—$C_{17}H_{35}$,
$(EtO)_3Si$—$(CH_2)_3$—S—$(CH_2)_3$—S—C(=O)—$CH_3$,
$(EtO)_3Si$—$(CH_2)_3$—S—$(CH_2)_3$—S—C(=O)—$C_2H_5$,
$(EtO)_3Si$—$(CH_2)_3$—S—$(CH_2)_3$—S—C(=O)—$C_3H_7$,
$(EtO)_3Si$—$(CH_2)_3$—S—$(CH_2)_3$—S—C(=O)—$C_4H_9$,
$(EtO)_3Si$—$(CH_2)_3$—S—$(CH_2)_3$—S—C(=O)—$C_5H_{11}$,
$(EtO)_3Si$—$(CH_2)_3$—S—$(CH_2)_3$—S—C(=O)—$C_6H_3$,
$(EtO)_3Si$—$(CH_2)_3$—S—$(CH_2)_3$—S—C(=O)—$C_7H_{15}$,
$(EtO)_3Si$—$(CH_2)_3$—S—$(CH_2)_3$—S—C(=O)—$C_9H_9$,
$(EtO)_3Si$—$(CH_2)_3$—S—$(CH_2)_3$—S—C(=O)—$C_{11}H_{23}$,
$(EtO)_3Si$—$(CH_2)_3$—S—$(CH_2)_3$—S—C(=O)—$C_3H_{27}$,
$(EtO)_3Si$—$(CH_2)_3$—S—$(CH_2)_3$—S—C(=O)—$C_{15}H_{31}$,
$(EtO)_3Si$—$(CH_2)_3$—S—$(CH_2)_3$—S—C(=O)—$C_{17}H_{35}$,
$(EtO)_3Si$—$(CH_2)_3$—S—$(CH_2)_6$—S—C(=O)—$CH_3$,
$(EtO)_3Si$—$(CH_2)_3$—S—$(CH_2)_6$—S—C(=O)—$C_2H_5$,
$(EtO)_3Si$—$(CH_2)_3$—S—$(CH_2)_6$—S—C(=O)—$C_3H_7$,
$(EtO)_3Si$—$(CH_2)_3$—S—$(CH_2)_6$—S—C(=O)—$C_4H_9$,
$(EtO)_3Si$—$(CH_2)_3$—S—$(CH_2)_6$—S—C(=O)—$C_5H_{11}$,
$(EtO)_3Si$—$(CH_2)_3$—S—$(CH_2)_6$—S—C(=O)—$C_6H_3$,
$(EtO)_3Si$—$(CH_2)_3$—S—$(CH_2)_6$—S—C(=O)—$C_7H_{15}$,
$(EtO)_3Si$—$(CH_2)_3$—S—$(CH_2)_6$—S—C(=O)—$C_9H_9$,
$(EtO)_3Si$—$(CH_2)_3$—S—$(CH_2)_6$—S—C(=O)—$C_{11}H_{23}$,
$(EtO)_3Si$—$(CH_2)_3$—S—$(CH_2)_6$—S—C(=O)—$C_3H_{27}$,
$(EtO)_3Si$—$(CH_2)_3$—S—$(CH_2)_6$—S—C(=O)—$C_{15}H_{31}$,
$(EtO)_3Si$—$(CH_2)_3$—S—$(CH_2)_6$—S—C(=O)—$C_{17}H_{35}$.

In one preferred embodiment of the invention the silane A has the following structure conforming to formula A-II):

$(EtO)_3Si$—$(CH_2)_3$—S—$(CH_2)_6$—S—C(=O)—$CH_3$   A-II)

In one preferred embodiment of the invention the silane A has the following structure conforming to formula A-III):

$(EtO)_3Si$—$(CH_2)_3$—S—$(CH_2)_6$—S—C(=O)—$(CH_2)_6$—$CH_3$   A-III)

In one preferred embodiment of the invention the silane A has the following structure conforming to formula A-IV):

$(EtO)_3Si$—$(CH_2)_3$—S—$(CH_2)_6$—S—C(=O)—$(CH_2)_{16}$—$CH_3$   A-IV)

It is also conceivable for the rubber mixture according to the invention to contain a mixture of two or more of the silanes A-II), A-III), and A-IV).

It is also conceivable for the rubber mixture according to the invention to contain a mixture of the silanes A-II) and/or A-III) and/or A-IV with at least one further silane of superordinate formula A-I).

The total amount of silanes A conforming to formula A-I) present is in each case 1 to 30 phf, preferably 2 to 20 phf, particularly preferably 2 to 10 phf.

In one advantageous development of the invention the amount of silanes A present is at least 2.5 phf.

In a further advantageous development of the invention the amount of silanes A present is at least 3 phf.

In a further advantageous development of the invention the amount of silanes A present is at least 3.5 phf.

The amounts preferred minimum amounts each also apply when only one silane of type A is present.

Especially the preferred and particularly preferred amounts and the recited developments/embodiments result in very good characteristics in terms of rolling resistance and handling predictors.

Silanes B of the formula B-I) may preferably be:
$(EtO)_3Si$—$CH_2$—S—$CH_2$—S—$CH_2$—$Si(OEt)_3$,
$(EtO)_3Si$—$(CH_2)_2$—S—$CH_2$—S—$(CH_2)_2$—$Si(OEt)_3$,
$(EtO)_3Si$—$(CH_2)_3$—S—$CH_2$—S—$(CH_2)_3$—$Si(OEt)_3$,
$(EtO)_3Si$—$CH_2$—S—$(CH_2)_2$—S—$CH_2$—$Si(OEt)_3$,
$(EtO)_3Si$—$(CH_2)_2$—S—$(CH_2)_2$—S—$(CH_2)_2$—$Si(OEt)_3$,
$(EtO)_3Si$—$(CH_2)_3$—S—$(CH_2)_2$—S—$(CH_2)_3$—$Si(OEt)_3$,
$(EtO)_3Si$—$CH_2$—S—$(CH_2)_3$—S—$CH_2$—$Si(OEt)_3$,
$(EtO)_3Si$—$(CH_2)_2$—S—$(CH_2)_3$—S—$(CH_2)_2$—$Si(OEt)_3$,
$(EtO)_3Si$—$(CH_2)_3$—S—$(CH_2)_3$—S—$(CH_2)_3$—$Si(OEt)_3$,
$(EtO)_3Si$—$CH_2$—S—$(CH_2)_4$—S—$CH_2$—$Si(OEt)_3$,
$(EtO)_3Si$—$(CH_2)_2$—S—$(CH_2)_4$—S—$(CH_2)_2$—$Si(OEt)_3$,
$(EtO)_3Si$—$(CH_2)_3$—S—$(CH_2)_4$—S—$(CH_2)_3$—$Si(OEt)_3$,
$(EtO)_3Si$—$CH_2$—S—$(CH_2)_5$—S—$CH_2$—$Si(OEt)_3$,
$(EtO)_3Si$—$(CH_2)_2$—S—$(CH_2)_5$—S—$(CH_2)_2$—$Si(OEt)_3$,
$(EtO)_3Si$—$(CH_2)_3$—S—$(CH_2)_5$—S—$(CH_2)_3$—$Si(OEt)_3$, (EtO)₃Si—CH₂—S—(CH₂)₆—S—CH₂—Si(OEt)₃,
(EtO)₃Si—(CH₂)₂—S—(CH₂)₆—S—(CH₂)₂—Si(OEt)₃,
(EtO)₃Si—(CH₂)₃—S—(CH₂)₆—S—(CH₂)₃—Si(OEt)₃.

In a preferred embodiment of the invention the silane B has the following structure conforming to formula B-II):

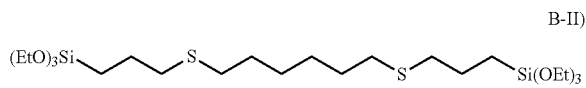

i.e. (EtO)₃Si—(CH₂)₃—S—(CH₂)₆—S—(CH₂)₃—Si(OEt)₃.

Especially with a silane according to formula B-II) particularly optimized handling and rolling resistance predictors are achieved.

It is particularly surprising here that the combination of a silane A conforming to formula A-I, preferably a silane conforming to formula A-II) and/or formula A-III), with a silane B conforming to formula B-I), preferably a silane conforming to formula B-II), results in a synergistic effect in respect of the handling and rolling resistance predictors.

It is also conceivable for the rubber mixture according to the invention to contain a mixture of two silanes of formula B-I), for example B-II) with a further silane of formula B-I).

The total amount of silanes B conforming to formula B-I) present is in each case 0.5 to 30 phf, preferably 0.5 to 20 phf, particularly preferably 0.5 to 10 phf.

In an advantageous development of the invention the amount of silanes B present is at least 0.7 phf.

In a further advantageous development of the invention the amount of silanes B present is at least 1.0 phf.

In a further advantageous development of the invention the amount of silanes B present is at least 1.5 phf.

The preferred minimum amounts each also apply when only one silane of type B is present.

Especially the preferred and particularly preferred amounts and developments or embodiments result in very good characteristics in terms of rolling resistance and handling predictors.

The silanes A and/or B present according to the invention may have been applied to a carrier, for example wax, polymer or carbon black, and may have been added to the rubber mixture in this form. The silanes A and/or B present according to the invention may have been applied to a silica, wherein the bonding may be physical or chemical.

The silanes A and B may be applied to silica separately from one another, with these silicas then being added to the mixture, or the silanes A and B may be applied to one silica together.

The application of the silanes A and/or B present according to the invention onto silica reduces for example the emission of volatile byproducts, such as ethanol when using ethoxy-substituted silanes ($R^1$=ethoxy).

It is particularly preferable when the molar ratio of silanes A present to silanes B present is 20:80 to 90:10, preferably 25:75 to 85:15, particularly preferably 25:75 to 80:20, very particularly preferably 30:70 to 75:25.

It is preferable when at least the amount of silanes A present is at least 2 phf, particularly preferably at least 2.5 phf, and at least the amount of silanes B present is at least 0.7 phf, preferably at least 1.0 phf, particularly preferably at least 1.5 phf.

In an advantageous embodiment of the invention the silane(s) A and the silane(s) B are mixed with one another before addition to the rubber mixture, preferably in the recited molar ratios A to B.

Thus silane need only be added once and only one form of addition is therefore necessary. The mixing of the silanes may be performed under exclusion of air. The mixing of the silanes may be performed under a protective gas atmosphere, for example under argon or nitrogen, preferably under nitrogen.

The mixing of the silanes may be performed at standard pressure, elevated pressure or reduced pressure. The mixing of the silanes may preferably be performed at standard pressure. Elevated pressure may be a pressure of 1.1 bar to 100 bar, preferably of 1.1 bar to 50 bar, particularly preferably of 1.1 bar to 10 bar and very particularly preferably of 1.1 to 5 bar. Reduced pressure may be a pressure of 1 mbar to 1000 mbar, preferably 250 mbar to 1000 mbar, particularly preferably 500 mbar to 1000 mbar.

The mixing of the silanes may be performed between 20° C. and 100° C., preferably between 20° C. and 50° C., particularly preferably between 20° C. and 30° C.

The mixing of the silanes may be performed in a solvent, for example methanol, ethanol, propanol, butanol, cyclohexanol, N,N-dimethylformamide, dimethyl sulfoxide, pentane, hexane, cyclohexane, heptane, octane, decane, toluene, xylene, acetone, acetonitrile, carbon tetrachloride, chloroform, dichloromethane, 1,2-dichloroethane, tetrachloroethylene, diethyl ether, methyl tert-butyl ether, methyl ethyl ketone, tetrahydrofuran, dioxane, pyridine or methyl acetate, or a mixture of the aforementioned solvents. The mixing of the silanes is preferably performed without solvents.

It is further conceivable for the rubber mixture according to the invention to contain at least one further silane coupling agent which is not a silane A or a silane B.

The rubber mixture may moreover contain further activators and/or agents for the bonding of fillers, in particular carbon black. An example thereof is the compound S-(3-aminopropyl)thiosulfuric acid disclosed in EP 2589619 A1 and/or the metal salts thereof which result in very good physical characteristics of the rubber mixture in particular upon combination with at least one carbon black as a filler.

The rubber mixture may further contain customary additives in customary weight fractions which are preferably added in at least one base mixing stage in the production of said mixture. These additives include:

a) anti-aging additives, for example N-phenyl-N'-(1,3-dimethylbutyl)-p-phenylenediamine (6PPD), N,N'-diphenyl-p-phenylenediamine (DPPD), N,N'-ditolyl-p-phenylenediamine (DTPD), N-isopropyl-N'-phenyl-p-phenylenediamine (IPPD), 2,2,4-trimethyl-1,2-dihydroquinoline (TMQ), b) activators, for example zinc oxide and fatty acids (e.g. stearic acid) and/or other activators, such as zinc complexes such as for example zinc ethylhexanoate, c) waxes, d) hydrocarbon resins, such as optionally adhesive resins in particular, e) mastication aids, for example 2,2'-dibenzamidodiphenyldisulfide (DBD), f) processing aids, such as in particular fatty acid esters and metal soaps, for example zinc soaps and/or calcium soaps, and g) plasticizers.

The plasticizers used in the context of the present invention include all plasticizers that are known to those skilled in the art such as aromatic, naphthenic or paraffinic mineral oil plasticizers, for example MES (mild extracted solvents) or RAE (residual aromatic extract) or TDAE (treated distilled aromatic extracts), or rubber-to-liquid oils (RTL) or biomass-to-liquid oils (BTL) preferably having a content of polycyclic aromatics of less than 3% by weight according to method IP 346, or triglycerides, for example rapeseed oil or factices or hydrocarbon resins or liquid polymers having an average molecular weight (determination by GPC=gel permeation chromatography based on BS ISO 11344:2004) between 500 and 20 000 g/mol. If additional liquid polymers are used as plasticizers in the rubber mixture according to the invention these are not included as rubber in the calculation of the composition of the polymer matrix.

The plasticizer is preferably selected from the group consisting of the abovementioned plasticizers.

The plasticizer is particularly preferably selected from the group consisting of hydrocarbon resins, liquid polymers and mineral oils.

When using mineral oil said oil is preferably selected from the group consisting of DAE (distilled aromatic extracts) und/or RAE (residual aromatic extracts) and/or TDAE (treated distilled aromatic extracts) and/or MES (mild extracted solvents) and/or naphthenic oils.

In a preferred embodiment of the invention the rubber mixture contains at least one mineral oil plasticizer, preferably at least TDAE and/or RAE, as a plasticizer. This results in particularly good processabilities, in particular a good miscibility of the rubber mixture. In a preferred embodiment of the invention the rubber mixture contains at least one liquid polymer as a plasticizer.

In a preferred embodiment of the invention the rubber mixture contains at least one hydrocarbon resin as a plasticizer.

It will be appreciated by those skilled in the art that hydrocarbon resins are polymers constructed from monomers and the hydrocarbon resin via the linking of the monomers to one another is formally constructed from derivatives of the monomers. However, in the context of the present invention these hydrocarbon resins are not included among the rubbers. In the context of the present application the term "hydrocarbon resins" comprises resins which may comprise carbon atoms and hydrogen atoms and optionally heteroatoms, such as in particular oxygen atoms. The hydrocarbon resin may be a homopolymer or a copolymer. In the the present application a homopolymer is to be understood as meaning a polymer which as per Römpp Online Version 3.28 "is formed from monomers of only one type". The monomers may be selected from any monomers of hydrocarbon resins known to those skilled in the art, such as aliphatic $C_5$-monomers and further unsaturated compounds which may be cationically polymerized, containing aromatics and/or terpenes and/or alkenes and/or cycloalkenes.

In a preferred embodiment of the invention the hydrocarbon resin is selected from the group consisting of aliphatic $C_5$-resins and hydrocarbon resins of alpha-methylstirene and stirene.

The hydrocarbon resin preferably has a softening point according to ASTM E 28 (Ring and Ball) of 10° C. to 180° C., particularly preferably of 60° C. to 150° C., very particularly preferably of 80° C. to 99° C. The hydrocarbon resin preferably further has a molecular weight Mw of 500 to 4000 g/mol, preferably of 1300 to 2500 g/mol.

The quantity fraction of the total amount of further additives is 3 to 150 phr, preferably 3 to 100 phr and particularly preferably 5 to 80 phr.

Zinc oxide (ZnO) may be included in the total quantity fraction of the further additives. This may be selected from all types of zinc oxide known to those skilled in the art, for example ZnO granulate or powder. The conventionally used zinc oxide generally has a BET surface area of less than 10 $m^2/g$. However, it is also possible to use a zinc oxide having a BET surface area of 10 to 100 $m^2/g$, for example so-called "nano-zinc oxides".

Particularly when using the rubber mixture according to the invention for the internal components of a tire or of a technical rubber article that have direct contact with strength members present, a suitable adhesion system, often in the form of adhesive resins, is generally also added to the rubber mixture.

The vulcanization is preferably performed in the presence of sulfur and/or sulfur donors and with the aid of vulcanization accelerators, wherein a number of vulcanization accelerators can also act as sulfur donors.

Sulfur and/or further sulfur donors and one or more accelerators are added to the rubber mixture in the last mixing step. The accelerator is selected from the group consisting of thiazole accelerators and/or mercapto accelerators and/or sulfenamide accelerators and/or thiocarbamate accelerators and/or thiuram accelerators and/or thiophosphate accelerators and/or thiourea accelerators and/or xanthate accelerators and/or guanidine accelerators. It is preferable to use at least one sulfenamide accelerator selected from the group consisting of N-cyclohexyl-2-benzothiazolesulfenamide (CBS) and/or N,N-dicyclohexylbenzothiazole-2-sulfenamide (DCBS) and/or benzothiazyl-2-sulfenmorpholide (MBS) and/or N-tert-butyl-2-benzothiazylsulfenamide (TBBS).

Employable sulfur-donating substances are any sulfur-donating substances known to those skilled in the art. When the rubber mixture contains a sulfur-donating substance, said substance is preferably selected from the group containing for example thiuramdisulfides, for example tetrabenzylthiuramdisulfide (TBzTD) and/or tetramethylthiuramdisulfide (TMTD) and/or tetraethylthiuramdisulfide (TETD), and/or thiuramtetrasulfides, for example dipentamethylenethiuramtetrasulfide (DPTT), and/or dithiophosphates, for example DipDis (bis(diisopropyl)thiophosphoryldisulfide) and/or bis(O,O-2-ethylhexylthiophosphoryl)polysulfide (e.g. Rhenocure SDT 50®, Rheinchemie GmbH) and/or zinc dichloryldithiophosphate (e.g. Rhenocure ZDT/S®, Rheinchemie GmbH) and/or zinc alkyldithiophosphate, and/or 1,6-bis(N,N-dibenzylthiocarbamoyldithio)hexane and/or diarylpolysulfides and/or dialkylpolysulfides.

Further network-forming systems, such as are obtainable for example under the trade names Vulkuren®, Duralink® or Perkalink®, or network-forming systems such as are described in WO 2010/049216 A2 may be employed in the rubber mixture. This system contains a vulcanization agent which crosslinks with a functionality greater than four and at least one vulcanization accelerator.

The required amount of further sulfur in the form of elemental sulfur and/or further sulfur-donor depends on the field of application of the respective rubber mixture. The respective amounts of the addition are known to those skilled in the art. For the addition of elemental sulfur the amounts in the case of a rubber mixture for the bead of vehicle tires are for example 0 to 5 phr. For treads of vehicle tires which generally have a lower sulfur content compared to the bead the amount of elemental sulfur to be added is preferably 0 to 4 phr.

In an advantageous development of the invention a plurality of accelerators are employed.

It is preferable when a sulfenamide accelerator, particularly preferably CBS, is used in combination with the guanidine accelerator DPG (diphenylguanidine). The amount of DPG here is 0 to 5 phr, preferably 0.1 to 3 phr, particularly preferably 0.5 to 2.5 phr, very particularly preferably 1 to 2.5 phr.

Vulcanization retarders may also be present in the rubber mixture.

The terms "vulcanized" and "crosslinked" are used synonymously in the context of the present invention.

The present invention further provides a process for producing the sulfur-crosslinkable rubber mixture according to the invention in which initially in one or more mixing stages a base mixture comprising all constituents other than the vulcanization system is produced.

The final mixture is generated by addition of the vulcanization system in a last mixing stage. The final mixture is subjected to further processing by an extrusion operation or calendaring for example and brought into the appropriate shape. This is followed by further processing by vulcanization, wherein on account of the vulcanization system added in the context of the present invention sulfur crosslinking takes place.

In an advantageous embodiment of the process according to the invention the silane(s) A and the silane(s) B are mixed with one another before addition to the rubber mixture, preferably in the recited molar ratios A to B and under the abovementioned conditions including all described elucidations.

In an advantageous embodiment of the process according to the invention the silanes A and/or B have been applied to a silica, wherein the bonding may be physical or chemical, and are added to the rubber mixture in this form preferably in a base mixing stage.

The above-described rubber mixture according to the invention is particularly suitable for use in vehicle tires, in particular pneumatic vehicle tires. Use in any tire components is conceivable in principle, in particular in a tread, in particular in the cap of a tread with a cap/base construction as previously described hereinabove.

For use in vehicle tires the mixture is preferably brought into the shape of a tread as a final mixture before vulcanization and during production of the green vehicle tire applied in known fashion.

The production of the rubber mixture according to the invention for use as a sidewall or other body mixture in vehicle tires is carried out as described hereinabove. The difference is in the shaping after the extrusion operation/the calendaring of the mixture. The thus obtained forms of the as yet unvulcanized rubber mixture for one or more different body mixtures are then used for construction of a green tire.

The body mixture is to be understood as meaning the rubber mixtures for the other component parts of a tire, such as essentially the separating plate, innerliner (inner layer), core profile, belt, shoulder, belt profile, carcass, bead reinforcement, bead profile, flange profile and bandage. For use of the rubber mixture according to the invention in drive belts and other belts, especially in conveyor belts, the extruded, as yet unvulcanized mixture is brought into the appropriate shape and often provided at the same time or subsequently with strength members, for example synthetic fibres or steel cords. This usually affords a multilayer construction consisting of one and/or more plies of rubber mixture, one and/or more plies of identical and/or different strength members and one and/or more further plies of the same and/or another rubber mixture.

The invention will now be more particularly elucidated with the aid of comparative examples and working examples which are summarized in the following tables. The general composition of the rubber mixture upon which the examples are based is summarized in table 1 under R1 (recipe 1). In tables 2 to 5 both the employed silane types and the silane amounts were then varied to afford comparative mixtures and inventive mixtures. The comparative mixtures are labeled V and the inventive mixtures are labeled E. Tables 2 and 3 are related and related tests comprise adding silane B in addition to silane A. Tables 4 and 5 show further working examples and related test series here comprise undertaking a complete or partial substitution of silane A by silane B, starting from comparative mixtures.

In the individual examples the respective silanes were premixed with one another and then added to the rubber mixture in the base mixing stage. The reported quantities for the silanes in phf relate to 95 phr of silica.

Production of
1-chloro-6-thiopropyltriethoxysilylhexane

NaOEt (21% in EtOH; 1562 g; 4.820 mol) was added to mercaptopropyltriethoxysilane (1233 g; 5.170 mol) over 1 h while stirring at room temperature. Once addition was complete the reaction mixture was heated at reflux for 2 h and then left to cool to room temperature. The intermediate formed was added over 30 min to 1,6-dichlorohexane (4828 g; 31.14 mol) that had been heated to 80° C. Once addition was complete the reaction mixture was heated at reflux for 3 h, before being left to cool to room temperature. The reaction mixture was filtered and the filtercake was rinsed with EtOH. The volatile constituents were removed under reduced pressure and the intermediate product 1-chloro-6-thiopropyltriethoxysilylhexane (yield: 89%, molar ratio: 97% 1-chloro-6-thiopropyltriethoxysilylhexane, 3% bis (thiopropyltriethoxysilyl)hexane (silane B-II)); % by weight: 95% by weight 1-chloro-6-thiopropyltriethoxysilyl-hexane, 5% by weight 1,6-bis(thiopropyltriethoxysilyl) hexane (silane B-II)) was obtained as a colourless to brown liquid.

The silane $^f$ was produced as follows:

Na$_2$CO$_3$ (59.78 g; 0.564 mol) and an aqueous solution of NaSH (40% in water; 79.04 g; 0.564 mol) were initially charged together with water (97.52 g). Then tetrabutylphosphonium bromide (TBPB) (50% in water; 3.190 g; 0.005 mol) was added and acetyl chloride (40.58 g; 0.517 mol) added dropwise over 1 h, the reaction temperature being maintained at 25-32° C. Upon complete addition of the acetyl chloride, the mixture was stirred at room temperature for 1 h. Then TBPB (50% in water; 3.190 g; 0.005 mol) and 1-chloro-6-thiopropyltriethoxysilylhexane (see above; 167.8 g; 0.470 mol) were added and the mixture heated at reflux for 3-5 h. The progress of the reaction was monitored by means of gas chromatography. Once the 1-chloro-6-thiopropyltriethoxysilylhexane had reacted to an extent of >96%, water was added until all salts had dissolved and the phases were separated. The volatile constituents of the organic phase were removed under reduced pressure and S-(6-((3-(triethoxysilyl)propyl)thio)hexyl)thioacetate) (Yield: 90%, molar ratio: 97% S-(6-((3-(triethoxysilyl) propyl)thio)hexyl)thioacetate (silane A-II), 3% bis(thiopropyltriethoxysilyl)hexane (silane B-II);

% by weight: 96% by weight S-(6-((3-(triethoxysilyl) propyl)thio)hexyl)thioacetate (silane A-II), 4% by weight 1,6-bis(thiopropyltriethoxysilyl)hexane (silane B-II) was obtained as a yellow to brown liquid.

The silane $^{g)}$ was produced as follows:

$Na_2CO_3$ (220.2 g; 2.077 mol) and an aqueous solution of NaSH (40% in water; 291.2 g; 2.077 mol) were initially charged together with water (339.2 g). Then tetrabutylammonium bromide (TBAB) (50% in water; 10.96 g; 0.017 mol) was added and octanoyl chloride (307.2 g; 1.889 mol) added dropwise over 2.5 h, the reaction temperature being maintained at 24-28° C. Upon complete addition of the octanoyl chloride the mixture was stirred at room temperature for 1 h. Then TBAB (50% in water; 32.88 g; 0.051 mol) and 1-chloro-6-thiopropyltriethoxysilylhexane (see above; 606.9 g; 1.700 mol) were added and the mixture heated at reflux for 10 h. Then water was added until all salts had dissolved and the phases were separated. The volatile constituents of the organic phase were removed under reduced pressure and S-(6-((3-(triethoxysilyl)propyl)thio)hexyl)thiooctanoate (yield: 95%, molar ratio: 97% S-(6-((3-(triethoxysilyl)propyl)thio)hexyl)thiooctanoate (silane A-III), 3% bis(thiopropyltriethoxysilyl)hexane (silane B-II);

% by weight: 96% by weight S-(6-((3-(triethoxysilyl) propyl)thio)hexyl)thiooctanoate, 4% by weight 1,6-bis(thiopropyltriethoxysilyl)hexane) was obtained as a yellow to brown liquid.

The silane $^{h)}$ was produced from 1-chloro-6-thiopropyltriethoxysilylhexane (see above) as per the synthesis example 1 and 3 in JP2012149189.

S-(6-((3-(triethoxysilyl)propyl)thio)hexyl)thiooctadecanoate (yield: 89%, molar ratio: 97%

S-(6-((3-(triethoxysilyl)propyl)thio)hexyl)thiooctadecanoate (silane A-XIV), 3% bis(thiopropyltriethoxysilyl)hexane (silane B-II); % by weight: 97% by weight S-(6-((3-(triethoxysilyl)propyl)thio) hexyl)thiooctadecanoate, 3% by weight 1,6-bis(thiopropyltriethoxysilyl)hexane) was obtained as a yellow to brown liquid.

The silane $^{j)}$ (silane of the formula B-II): 1,6-bis(thiopropyltriethoxysilyl)hexane) was produced as follows:

To mercaptopropyltriethoxysilane (62.0 g; 0.260 mol; 2.10 eq) sodium methoxide (21% in EtOH; 82.3 g; 0.254 mol; 2.05 eq) is added portionwise at a rate such that the reaction temperature did not exceed 35° C. Once addition is complete the mixture is heated at reflux for 2 h. The reaction mixture is then added to 1,6-dichlorohexane (19.2 g; 0.124 mol; 1.00 eq) over 1.5 h at 80° C. Once addition is complete the mixture is heated at reflux for 3 h and then allowed to cool to room temperature. Precipitated salts are filtered off and the product is freed of solvent under reduced pressure. The product (yield: 88%, purity: >99% in $^{13}$C-NMR) was obtained as a clear liquid.

NMR method: The molar ratios and mass fractions reported in the examples as analytical results were obtained from $^{13}$C-NMR measurements with the following parameters: 100.6 MHz, 1000 Scans, solvent $CDCl_3$, internal standard for calibration: tetramethylsilane, relaxation agent $Cr(acac)_3$, to determine the mass fraction in the product a defined amount of dimethyl sulfone was added as internal standard and the molar ratios of the products thereto were used to calculate the mass fraction.

Mixture production was otherwise performed by the process customary in the rubber industry under typical conditions in three stages in a laboratory mixer having a volume of 300 millilitres to 3 litres by initially mixing in the first mixing stage (base mixing stage) all constituents except the vulcanization system (sulfur and vulcanization-influencing substances) at 145 to 165° C., target temperatures of 152 to 157° C., for 200 to 600 seconds.

In the second stage, the mixture from stage 1 was commixed once more, i.e. a so-called remill was performed. Addition of the vulcanization system in the third stage (final mixing stage) produced the final mixture, mixing being performed at 90° C. to 120° C. for 180 to 300 seconds.

All mixtures were used to produce test specimens by vulcanization after $t_{95}$ to $t_{100}$ (measured on a Moving Die Rheometer according to ASTM D 5289-12/ISO 6502) under pressure at 160° C. to 170° C. and these test specimens were used to determine material characteristics typical for the rubber industry with the test methods reported hereinbelow.

Loss factor tan δ (10%) and dynamic storage modulus G' (100%) from RPA (rubber process analyzer) based on ASTM D6601 from second strain sweep at 1 Hz and 70° C.;

stress at 300% elongation at room temperature RT (M300) according to DIN 53 504

Rebound elasticity at 70° C. according to ISO 4662 or ASTM D 1054

Conditioned Shore-A hardness at room temperature and 70° C. based on DIN ISO 7619-1, preconditioned 10 times with 5 MPa and subsequently tested according to ISO 868

Substances Used:
a) Silica: VN3, Evonik
b) Other additives: anti-aging additives, anti-ozonant wax, zinc oxide, stearic acid
c) DPG+CBS
d) Silane variants according to e) to j)
e) NXT, Momentive; contains to extent of >90% by weight the silane
A*)   $(EtO)_3Si-(CH_2)_3-S-C(=O)-(CH_2)_6-CH_3$, bonding but not inventive under formula A-I)
f) Contains 97 mol % silane of formula A-II, 3 mol % silane B-II): production as above
g) Contains 97 mol % silane of formula A-III), 3 mol % silane B-II): production as above h) Contains 97 mol % silane of formula A-IV), 3 mol % silane B-II): production as above
i) Silane B*: bistriethoxysilyloctane from ABCR GmbH; non-bonding but not inventive under formula B-I),
j) Silane of formula B-II) $(EtO)_3Si-(CH_2)_3-S-(CH_2)_6-S-(CH_2)_3-Si(OEt)_3$ (1,6-bis(thiopropyltriethoxysilyl)hexane), purity >99%, as above
k) Mole fraction in mol % of non-bonding silane B-II) in silane mixture: calculated from added silanes, [f), g)] and [h)] (i.e. taking account of low mol % of silane B-II) in silane [f),g)] and [h)])
l) Mole fraction in mol % of non-bonding silane type B* in silane mixture
m) Polybutadiene: Europrene Neocis BR 40, Polimeri
n) Sprintan* SLR-4601, Trinseo

TABLE 1

| Constituents | Unit | R1 |
|---|---|---|
| NR TSR | phr | 10 |
| BR [m)] | phr | 18 |
| SSBR [n)] | phr | 72 |
| Silica [a)] | phr | 95 |
| TDAE | phr | 50 |
| Other additives [b)] | phr | 9 |
| Silane - varied [d)] | phf | varied |
| Accelerator [c)] | phr | 4 |
| Sulfur | phr | 2 |

TABLE 2

|  | Unit | V1 | V2 | V3 | E1 | E2 | E3 |
|---|---|---|---|---|---|---|---|
| Silane [e)] | phf | 7.2 | 7.2 | 7.2 | — | — | — |
| Silane [g)] | phf | — | — | — | 7.2 | 7.2 | 7.2 |
| Silane [i)] | phf | 1.7 | 2.6 | 3.5 | — | — | — |
| Silane [j)] | phf | — | — | — | 1.7 | 2.5 | 3.3 |
| Mole % of B-II) [k)] | | — | — | — | 20 | 26 | 31 |
| Mole % of B [l)] | | 17 | 23 | 29 | — | — | — |
| G' (100%) | kPa | 427 | 400 | 422 | 580 | 610 | 641 |
| M300 RT | MPa | 2.6 | 2.5 | 2.6 | 5.1 | 5.3 | 5.4 |
| Rebound 70° C. | % | 38.6 | 38.4 | 39.2 | 45.9 | 47.2 | 47.3 |

TABLE 3

|  | Unit | E4 | E5 | E6 | E7 | E8 | E9 |
|---|---|---|---|---|---|---|---|
| Silane [h)] | phf | 7.2 | 7.2 | 7.2 | — | — | — |
| Silane [f)] | phf | — | — | — | 7.2 | 7.2 | — |
| Silane [j)] | phf | 1.3 | 1.95 | 2.6 | 2.0 | 3.0 | 7.2 |
| Mole % of B-II) [k)] | | 18 | 26 | 31 | 19 | 25 | 100 |
| G' (100%) | kPa | 576 | 636 | 623 | 691 | 736 | 555 |
| M300 RT | MPa | 4.3 | 3.8 | 4.0 | 4.1 | 4.6 | 3.2 |
| Rebound 70° C. | % | 43.6 | 41.1 | 43.1 | 42.8 | 44.4 | 39.6 |

TABLE 4

|  | Unit | V4 | V5 | V6 | V7 | E10 | E11 | E12 |
|---|---|---|---|---|---|---|---|---|
| Silane [e)] | phf | 11.1 | 6.6 | 4.4 | 2.2 | — | — | — |
| Silane [g)] | phf | — | — | — | — | 8.7 | 5.8 | 2.9 |
| Silane [i)] | phf | — | 2.7 | 4.0 | 5.3 | — | — | — |
| Silane [j)] | phf | — | — | — | — | 3.4 | 5.1 | 6.8 |
| Mole % of B-II [k)] | | — | — | — | — | 29 | 46 | 68 |
| Mole % of B* [l)] | | — | 25 | 43 | 67 | — | — | — |
| Cond. hardness RT | Shore A | 49.0 | 48.6 | 46.7 | 48.0 | 55.7 | 56.2 | 56.0 |
| Cond. hardness 70° C. | Shore A | 45.7 | 46.0 | 43.6 | 44.6 | 53.7 | 54.1 | 54.1 |
| Tan d (10%) | | 0.205 | 0.214 | 0.221 | 0.223 | 0.167 | 0.178 | 0.184 |

TABLE 5

|  | Unit | E13 | E14 | E15 | E16 | E17 | E18 | E19 | V8 |
|---|---|---|---|---|---|---|---|---|---|
| Silane [h)] | phf | 11.3 | 7.5 | 3.8 | — | — | — | — | — |
| Silane [f)] | phf | — | — | — | 9.6 | 7.2 | 4.8 | 2.4 | — |
| Silane [j)] | phf | 3.4 | 5.1 | 6.8 | 1.7 | 3.4 | 5.1 | 6.8 | 8.5 |
| Mole % of B-II) [k)] | | 29 | 45 | 68 | 14 | 27 | 45 | 68 | 100 |
| Cond. hardness RT | Shore A | — | 53.6 | 54.4 | 59.0 | 59.6 | 58.6 | 58.3 | 52.8 |
| Cond. hardness 70° C. | Shore A | — | 51.2 | 52.2 | 56.4 | 56.8 | 56.0 | 55.6 | 49.8 |
| Tan d (10%) | | 0.161 | 0.171 | 0.186 | 0.158 | 0.162 | 0.16 | 0.162 | 0.192 |

As is apparent from the tables the inventive rubber mixtures exhibit higher values for hardness and stiffness (G' and M300) compared to the prior art (comparative mixtures V1 to V7 according to WO 2012092062). At the same time they surprisingly exhibit improved rolling resistance indicators as is apparent from the lower hysteresis loss of tan delta and the higher rebound elasticity at 70° C.

The inventive vulcanizate and the inventive vehicle tire thus feature optimized handling and rolling resistance behaviour.

The invention claimed is:

1. A sulfur-crosslinkable rubber mixture comprising at least the following constituents:
   at least one diene rubber;
   10 to 300 phr of at least one silica;
   1 to 30 phf of at least one silane A having general empirical formula A-I):

$$(R^1)_oSi—R^2—(S—R^3)_q—S—X; \text{ and,} \quad \text{A-I)}$$

0.5 to 30 phf of at least one silane B having general empirical formula B-I):

$$(R^1)_oSi—R^2-(s-R^3)_u—S—R^2—Si(R^1)_o; \quad \text{B-I)}$$

wherein o may be 1, 2 or 3 and the radicals $R^1$ may be identical or different and are selected from $C_1$-$C_{10}$-alkoxy groups, $C_6$-$C_{20}$-phenoxy groups, $C_2$-$C_{10}$-cyclic dialkoxy groups, $C_2$-$C_{10}$-dialkoxy groups, $C_4$-$C_{10}$-cycloalkoxy groups, $C_6$-$C_{20}$-aryl groups, $C_1$-$C_{10}$-alkyl groups, $C_2$-$C_{20}$-alkenyl groups, $C_2$-$C_{20}$-alkynyl groups, $C_7$-$C_{20}$-aralkyl groups, halides or alkyl polyether group —O—$(R^6$—O$)_r$—$R^7$, wherein the radicals $R^6$ are identical or different and are branched or unbranched, saturated or unsaturated, aliphatic, aromatic or mixed aliphatic/aromatic divalent $C_1$-$C_{30}$-hydrocarbon group, r is an integer from 1 to 30, and the radicals $R^7$ are unsubstituted or substituted, branched or unbranched monovalent alkyl, alkenyl, aryl or aralkyl groups, or two $R^1$ correspond to a dialkoxy group having 2 to 10 carbon atoms wherein in that case o<3, or two or more silanes of formulae A-I) and/or B-I) may be bridged via radicals $R^1$ or by condensation; with the proviso that in the formulae A-I) and B-I) in each $(R^1)_oSi$ group at least one $R^1$ is selected from the abovementioned options where this $R^1$ i) is bonded to the silicon atom via an oxygen atom or ii) is a halide;
   wherein the radicals $R^2$ and $R^3$ in each molecule and within a molecule may be identical or different and are branched or unbranched, saturated or unsaturated, aliphatic, aromatic or mixed aliphatic/aromatic divalent $C_1$-$C_{30}$-hydrocarbon groups; and,
   wherein q is 1 or 2 or 3; and u is 1 or 2 or 3; and X is a hydrogen atom or a —C(=O)—$R^8$ group wherein $R^8$ is selected from hydrogen, $C_1$-$C_2$-alkyl groups, $C_6$-$C_{20}$-aryl groups, $C_2$-$C_{20}$-alkenyl groups and $C_7$-$C_{20}$-aralkyl groups.

2. The sulfur-crosslinkable rubber mixture according to claim 1, wherein q is 1.

3. The sulfur-crosslinkable rubber mixture according to claim 1, wherein u is 1.

4. The sulfur-crosslinkable rubber mixture according to claim 1, wherein $R^2$ is an alkyl group having 2 or 3 carbon atoms.

5. The sulfur-crosslinkable rubber mixture according to claim 1, wherein $R^3$ is an alkyl group having 4 to 8 carbon atoms.

6. The sulfur-crosslinkable rubber mixture according to claim 1, wherein X is an alkanoyl group.

7. The sulfur-crosslinkable rubber mixture according to claim 1, wherein the silane A has the following structure conforming to formula A-II):

$$(EtO)_3Si—(CH_2)_3—S—(CH_2)_6—S—C(=O)—CH_3. \quad \text{A-II)}$$

8. The sulfur-crosslinkable rubber mixture according to claim 1, wherein the silane A has the following structure conforming to formula A-III):

$$(EtO)_3Si—(CH_2)_3—S—(CH_2)_6—S—C(=O)—(CH_2)_6—CH_3. \quad \text{A-III)}$$

9. The sulfur-crosslinkable rubber mixture according to claim 1, wherein the silane A has the following structure conforming to formula A-IV):

$$(EtO)_3Si—(CH_2)_3—S—(CH_2)_6—S—C(=O)—(CH_2)_{16}—CH_3. \quad \text{A-IV)}$$

10. The sulfur-crosslinkable rubber mixture according to claim 1, wherein the silane B has the following structure conforming to formula B-II):

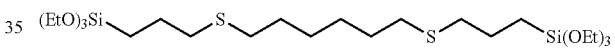

11. The sulfur-crosslinkable rubber mixture according to claim 1, wherein the molar ratio of silanes A present to silanes B present is 20:80 to 90:10.

12. The sulfur-crosslinkable rubber mixture according to claim 1, wherein the diene rubber is selected from the group consisting of natural polyisoprene (NR), synthetic polyisoprene (IR), butadiene rubber (BR), solution-polymerized stirene-butadiene rubber (SSBR) and emulsion-polymerized stirene-butadiene rubber (ESBR).

13. A vulcanizate obtained by sulfur vulcanization of at least one rubber mixture according to claim 1.

14. A vehicle tire comprising at least one component part based upon at least one vulcanizate according to claim 13.

15. The vehicle tire according to claim 14 comprising the at least one vulcanizate in a tread of the vehicle tire.

* * * * *